US008885502B2

(12) United States Patent
Huang et al.

(10) Patent No.: US 8,885,502 B2
(45) Date of Patent: Nov. 11, 2014

(54) FEEDBACK PROTOCOL FOR END-TO-END MULTIPLE PATH NETWORK SYSTEMS

(75) Inventors: Xiaolong Huang, San Diego, CA (US); Xun Luo, San Diego, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 240 days.

(21) Appl. No.: 13/228,671

(22) Filed: Sep. 9, 2011

(65) Prior Publication Data
US 2013/0064105 A1 Mar. 14, 2013

(51) Int. Cl.
*H04L 12/66* (2006.01)
*H04L 29/06* (2006.01)
*H04L 12/26* (2006.01)

(52) U.S. Cl.
CPC .......... *H04L 65/4015* (2013.01); *H04L 65/608* (2013.01); *H04L 43/10* (2013.01); *H04L 43/0864* (2013.01); *H04L 65/80* (2013.01)
USPC ........................................ 370/252

(58) Field of Classification Search
None
See application file for complete search history.

(56) References Cited

U.S. PATENT DOCUMENTS

| | | | |
|---|---|---|---|
| 6,580,909 B1 | 6/2003 | Carro | |
| 6,834,044 B2 | 12/2004 | Sugirtharaj et al. | |
| 6,954,435 B2 | 10/2005 | Billhartz et al. | |
| 7,388,841 B2 | 6/2008 | Shao et al. | |
| 7,502,328 B2 | 3/2009 | Lee et al. | |
| 7,643,427 B2 | 1/2010 | Kokku et al. | |
| 7,733,769 B1 | 6/2010 | Jennings et al. | |
| 7,839,850 B2 | 11/2010 | Kompella | |
| 7,961,710 B2 | 6/2011 | Lee et al. | |
| 2002/0073232 A1 | 6/2002 | Hong et al. | |
| 2003/0007515 A1 | 1/2003 | Apostolopoulos et al. | |
| 2006/0039371 A1 | 2/2006 | Castro et al. | |
| 2006/0041698 A1 | 2/2006 | Han et al. | |
| 2006/0077942 A1 | 4/2006 | Panwar et al. | |
| 2007/0064684 A1 | 3/2007 | Kottilingal | |

(Continued)

FOREIGN PATENT DOCUMENTS

| | | |
|---|---|---|
| WO | 0079730 A2 | 12/2000 |
| WO | 0223934 A1 | 3/2002 |

(Continued)

OTHER PUBLICATIONS

Apostolopoulos, J.G., et al., "Path diversity for enhanced media streaming," IEEE Communications Magazine, vol. 42, No. 8, pp. 80-87, Aug. 2004.
Gogate N. et al., "Supporting Image and Video Applications in a Multihop Radio Environment Using Path Diversity and Multiple Description Coding", IEEE Transactions on Circuits and Systems for Video Technology, vol. 12, No. 9, Sep. 2002. pp. 777-792.

(Continued)

*Primary Examiner* — Minh-Trang Nguyen
(74) *Attorney, Agent, or Firm* — Donald C. Kordich (57) ABSTRACT

A method, system, and computer program product for providing feedback over a multiple path network is provided. A first device sends a transmissions to a second device over at least two different paths of the network. Using information collected as a result of receiving the transmissions, the second device aggregates data regarding the performance of each of the paths together into a feedback message. The second device then sends this feedback message to the first device over one path of the network. The first device uses the data in the feedback message in its calculations for determining the relative performance of each path. The amount of traffic sent along each path is adjusted as appropriate, based on these calculations.

28 Claims, 9 Drawing Sheets

(56) References Cited

U.S. PATENT DOCUMENTS

| | | |
|---|---|---|
| 2007/0066315 A1* | 3/2007 | Kado .......................... 455/445 |
| 2007/0110035 A1 | 5/2007 | Bennett |
| 2008/0137653 A1 | 6/2008 | Jonsson |
| 2008/0205394 A1 | 8/2008 | Deshpande et al. |
| 2009/0073921 A1 | 3/2009 | Ji et al. |
| 2009/0161592 A1 | 6/2009 | So |
| 2009/0185492 A1* | 7/2009 | Senarath et al. ............. 370/238 |
| 2009/0227258 A1 | 9/2009 | Youn et al. |
| 2009/0290555 A1 | 11/2009 | Alpert et al. |
| 2010/0054155 A1 | 3/2010 | Cai et al. |
| 2010/0061244 A1 | 3/2010 | Meier et al. |
| 2010/0064049 A1 | 3/2010 | Magharei et al. |
| 2010/0085979 A1 | 4/2010 | Liu et al. |
| 2010/0088390 A1 | 4/2010 | Bai et al. |
| 2010/0121971 A1 | 5/2010 | Shao et al. |
| 2010/0260190 A1 | 10/2010 | Hiie et al. |
| 2010/0315958 A1 | 12/2010 | Luo et al. |
| 2011/0051651 A1 | 3/2011 | Wu et al. |
| 2011/0125921 A1 | 5/2011 | Karenos et al. |
| 2012/0303822 A1 | 11/2012 | Huang et al. |
| 2012/0311072 A1 | 12/2012 | Huang et al. |
| 2013/0136116 A1 | 5/2013 | Viswanathan et al. |

FOREIGN PATENT DOCUMENTS

| | | |
|---|---|---|
| WO | 02065803 A1 | 8/2002 |
| WO | 2006015614 A1 | 2/2006 |
| WO | 2006101979 A2 | 9/2006 |
| WO | 2007021725 A2 | 2/2007 |
| WO | WO2007020563 A1 | 2/2007 |
| WO | 2010143894 A2 | 12/2010 |

OTHER PUBLICATIONS

Hefeeda M., et al., "Promise: PeertoPeer Media Streaming Using CollectCast" Proceedings of the 11th. ACM International Conference on Multimedia. MM'03. Berkeley, CA, Nov. 4-6, 2003; [ACM International Multimedia Conference], New York, NY : ACM, US, vol. CONF. 11, Nov. 2, 2003, pp. 1-10, XP002409310.

International Search Report and Written Opinion—PCT/US2012/054465—ISA/EPO—Jan. 21, 2013.

Jurca D, "Media Flow Rate Allocation in Multipath Networks", IEEE Transactions on Multimedia, vol. 9, No. 6, Oct. 2007. pp. 1227-1240.

Kang, S.S., et al., "A mobile peer-to-peer approach for multimedia content sharing using 3G/WLAN dual mode channels," Wireless Communications & Mobile Computing—Special Issue: WLAN/3G Integration for Next-Generation Heterogeneous Mobile Data Networks, vol. 5 Issue 6, Sep. 2005, pp. 633-645.

Leung M.F., et al., "Broadcast-Based Peer-to-Peer Collaborative Video Streaming Among Mobiles," IEEE Transactions on Broadcasting, vol. 53, No. 1, Mar. 2007, pp. 350-361.

Vutukury, S., et al., "A simple MPLS-based flow aggregation scheme for providing scalable quality of service," Proceedings of SPIE, Quality of Service over Next-Generation Data Network, vol. 4524, pp. 91-98, Aug. 2001, Fig.1.

Ying He et al., "An adaptive algorithm for real-time data transmission in multi-hop overlay networks", Communications and Networking in China (CHINACOM), 2010 5th International ICST Conference on, Aug. 25-27, 2010, pp. 1-5, ISBN: 973-963-9799-97-4.

Papadopouli M., et al.,"Connection Sharing in an Ad Hoc Wireless Network among Collaborating Hosts", In Proc. International Workshop on Network and Operating System Support for Digital Audio and Video (NOSSDAV), 1999, pp. 169-185.

* cited by examiner

| Bit offset | 0 | 1 | 2 | 3 | 4 | 5 | 6 | 7 |
|---|---|---|---|---|---|---|---|---|
| 0 | Version | | | | Reserved | | | Ext |
| 8 | Message type | | | | | | | |
| 16 | Packet length | | | | | | | |
| 24 | Packet length (continued) | | | | | | | |

FEEDBACK PROTOCOL FOR END-TO-END MULTIPLE PATH NETWORK SYSTEMS

BACKGROUND

Field

Embodiments of the present invention relate generally to systems and processes for feedback protocols in networks having multiple paths.

SUMMARY

Various embodiments of the present invention provide a method, system, or computer program product for providing feedback over a network. According to example embodiments, a first device of the network sends at least two transmissions to a second device of the network. Two or more of the more of the at least two transmissions are each sent over a different path of the network. The first device receives information about the performance of at least two paths of the network from the second device. This information is sent over one path of the network. In various further embodiments, the first device makes at least one calculation regarding the performance of at least one path of the network, based on the received information. In still further embodiments, the amount of traffic sent to one or more paths of the network is adjusted, based at least in part on the at least one calculation.

In some embodiments, the first device calculates a travel time of a transmission along a second path of the network by subtracting a travel time along the first path of the network from a round-trip time. The round-trip time is a sum of the travel time of the transmission along the second path and the travel time along the first path of the network.

According to some embodiments of the present invention, the one path that the information is sent over is a direct path between the second device and the first device without any transfer helpers provided thereon.

In some embodiments, the received information includes information related to at least one buffer occupancy of the second device, the buffer occupancy relating to at least one the path of the network. In further embodiments, the information related to at least one buffer occupancy relating to at least one path includes a comparison of one or more buffer occupancies to a combined buffer occupancy relating to multiple paths or a buffer occupancy relating to one or more paths other than the at least one path.

According to some embodiments, the received information does not include a value or range of artificial delay for transmission over one or more paths of the network.

In other example embodiments, a second device of the network receives at least two transmissions from a first device in the network. Two or more of the at least two transmissions are each received from a different path of the network. The second device sends information about the performance of the paths of the network to the first device, over one path of the network.

According to some embodiments of the present invention, the one path that the information is sent over is a direct path between the second device and the first device without any transfer helpers provided thereon.

In some embodiments, the received information includes information related to at least one buffer occupancy of the second device, the buffer occupancy relating to at least one path of the network. In further embodiments, the information related to at least one buffer occupancy relating to at least one path includes a comparison of one or more buffer occupancies to a combined buffer occupancy relating to multiple paths or a buffer occupancy relating to one or more paths other than the at least one path.

According to some embodiments, the received information does not include a value or range of artificial delay for transmission over one or more paths of the network.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

As described in more detail below, embodiments of the present invention relate to systems and processes for feedback protocols for network(s) among which there are multiple transmission paths to choose from when sending a packet to a device. A path is an end-to-end route between a source node of the network and a destination node of the network. In some embodiments, the path may traverse one or more intermediate nodes between the source and destination, or no intermediate nodes. In some embodiments, the path includes one or more segments such that each segment connects two nodes.

Figure 1:
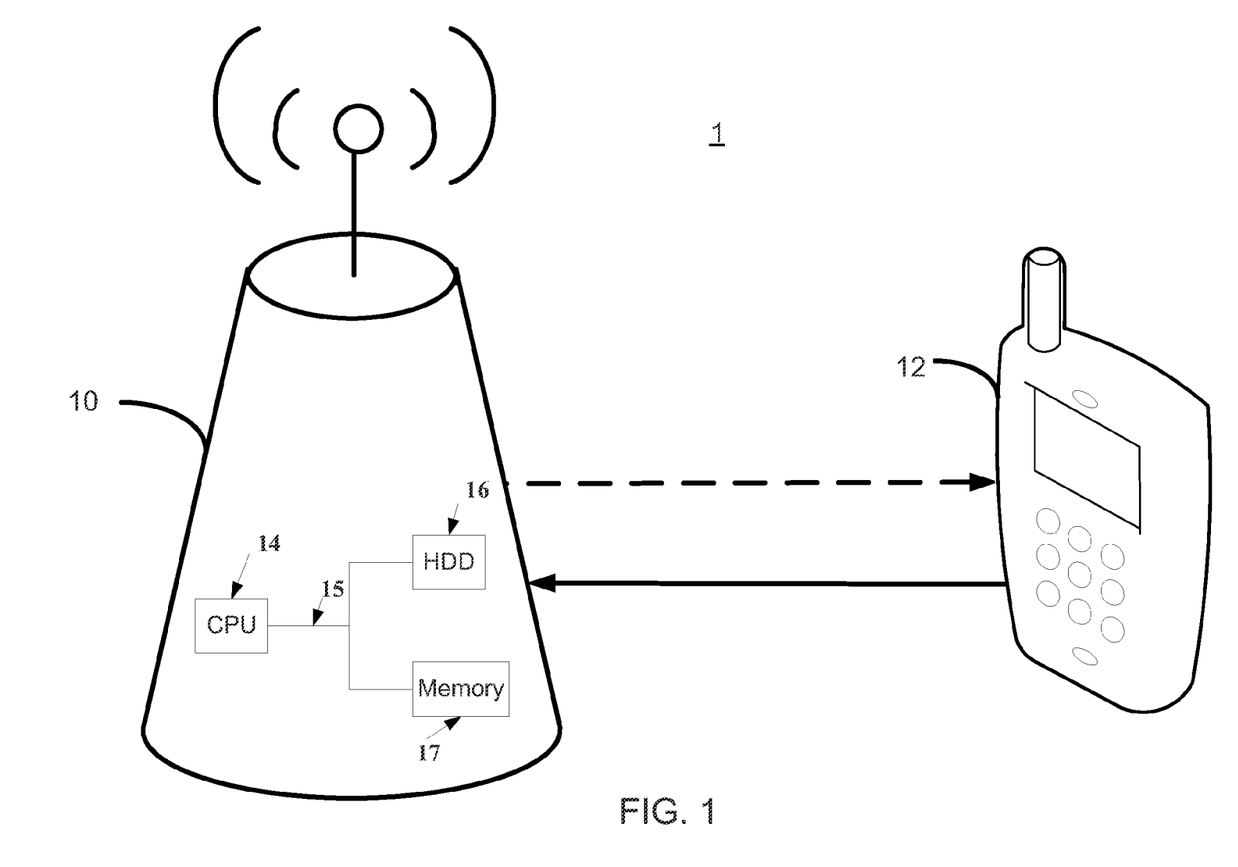
FIG. 1 illustrates a high-level overview of an exemplary network environment according to an embodiment of the present invention.

FIG. 1 illustrates a system 1 in accordance with an embodiment. The system 1 includes a Source device 10 and an Aggregator device 12, which are nodes of the network. Data packets are communicated between the Source device 10 and the Aggregator device 12. In some embodiments, the Source device 10 is a communication device such as, but not limited to, a router for wireless communications. According to some embodiments, the Aggregator device 12 is a communication device such as, but not limited to, a mobile phone.

Embodiments may be practiced in a networked environment using logical connections to one or more remote computers having processors. Those skilled in the art will appreciate that the network nodes (such as, but not limited to, the Source device 10 and the Aggregator device 12) and helper devices of such network computing environments may encompass many types of computers, smart phones, data phones, wireless communication devices, including personal computers, hand-held devices, multi-processor systems, microprocessor-based or programmable consumer electronics, network PCs, minicomputers, mainframe computers, hubs, routers, base stations, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The Source device 10 includes an electronic computing device including, but not limited to, one or more general-purpose computers, including one or more processing units 14 or processors, a system memory 17, and a system bus 15 that couples various system components including the system memory 17 to the processing unit 14. The system memory 17 includes any suitable device or devices for storing electronic data, including, but not limited to, Random Access Memory (RAM). The computer(s) includes a storage medium 16, such as, but not limited to, one or more solid state storage devices and/or magnetic hard disk drives (HDD) for reading from and writing to a magnetic hard disk, magnetic disk drives for reading from or writing to a removable magnetic disk, and optical disk drives for reading from or writing to removable optical disk such as a Compact Disc Read-Write (CD-RW) or other optical media, flash memory, etc. The drives and their associated computer-readable media provide non-transient, non-volatile storage of computer-executable instructions, data structures, program modules, and other data for the computer. Various embodiments employing software and/or Web implementations are accomplished with standard programming techniques. Computer(s) are configured by software, hardware, firmware, or a combination thereof, to perform functions as described herein.

According to various embodiments, the Aggregator device 12 and/or helper devices linking the Source device 10 and the Aggregator device also include their own processor(s), memory, and/or storage medium(s) connected by system bus(es) that connect the various system components of the respective device. The processor(s) are configured to perform functions as described herein.

In various embodiments, one or more of the network(s) provides services, access to services, relays data, or the like. In an example embodiment, the network(s) allow the Aggregator device 12 to perform voice communications with other mobile device(s). In another embodiments, the network(s) may allow the Aggregator device 12 to access other services, such as but not limited to, the Internet, Mobile Applications, GPS, SMS, and the like.

In various embodiments, the network node(s) can exchange voice and data signals with other node(s) using any number or combination of communication standards (e.g., GSM, CDMA, TDNM, WCDMA, OFDM, GPRS, EV-DO, WiFi, WiMAX, S02.xx, UWB, LTE, satellite, etc). The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network can implement a radio technology such as Universal Terrestrial Radio Access (UTRA), cdma2000, etc. UTRA includes Wideband-CDMA (W-CDMA) and Low Chip Rate (LCR). CDMA2000 covers IS-2000, IS-95, and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "rd Generation Partnership Project" (3GPP). CDMA2000 is described in documents from an organization named "rd Generation Partnership Project 2" (3 GPP2).

Figure 2:
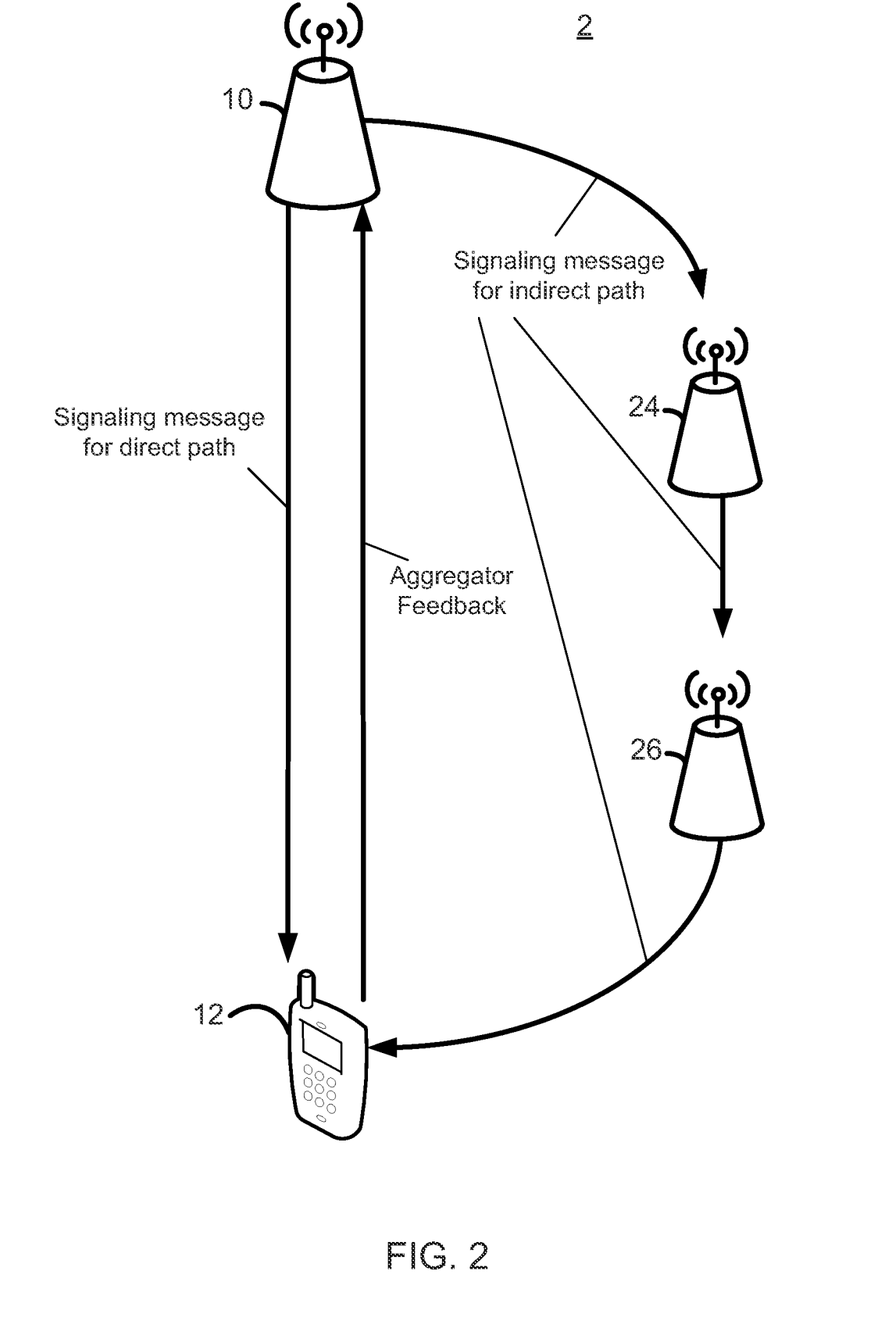
FIG. 2 illustrates an exemplary network environment according to an embodiment of the present invention.

FIG. 2 illustrates a system 2 in accordance with an embodiment regarding a multiple path overlay network. The Source Helper device 24 of system 2 is a node of the network that is used by the Source device 10 to help forward data from the Source device 10. Similarly, the Aggregator Helper device 26 is a node of the network that is used by the Source device 10 to help forward data to the Aggregator device 10.

In system 2, there is more than one path that a transmission could take from the Source device 10 to the Aggregator device 12. A first path exists directly between the Source device 10 and the Aggregator device 12. A second path exists from the Source device 10 to a Source Helper device 24, to an Aggregator Helper device 26, to the Aggregator device 12. This second path is indirect, that is, there is at least one intermediate transfer helper device 24, 26 between the Source device 10 and the Aggregator device 12. In other embodiments, more than two paths between the Source 10 and Aggregator devices 12 exist. In some embodiments, there may be more than one direct path, more than one indirect path, or any combination of direct and indirect paths.

A generalized example of a process carried out by a Source device 10 is described with reference to FIG. 3. A corresponding generalized example of a process carried out by an Aggregator device 12 is described with reference to FIG. 4. The goal of processes 3 and 4 is to determine the performance of at least two transmission paths between the Source device 10 and the Aggregator device 12.

Figure 3:
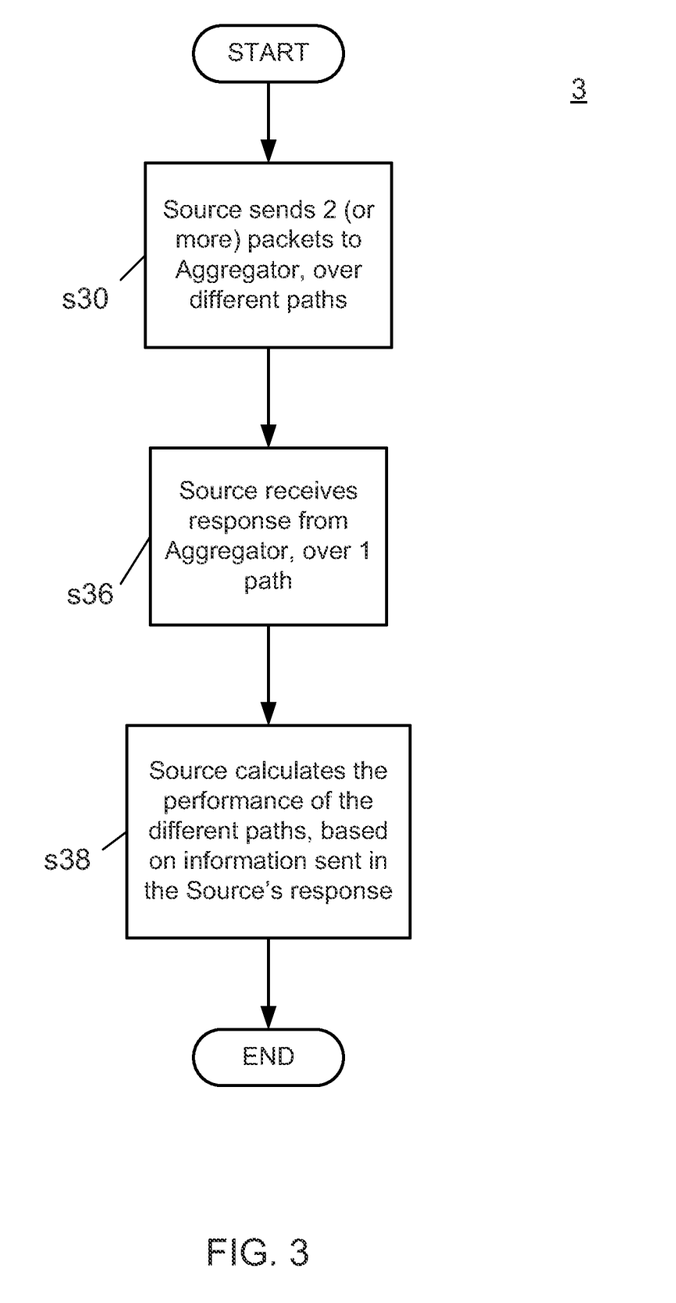
FIG. 3 illustrates a flow diagram of a process for a source-side implementation, according to an embodiment of the present invention.

In step S30 of FIG. 3, the Source device 10 sends one or more signaling messages to the Aggregator device 12 over at least two of the paths between them.

Figure 4:
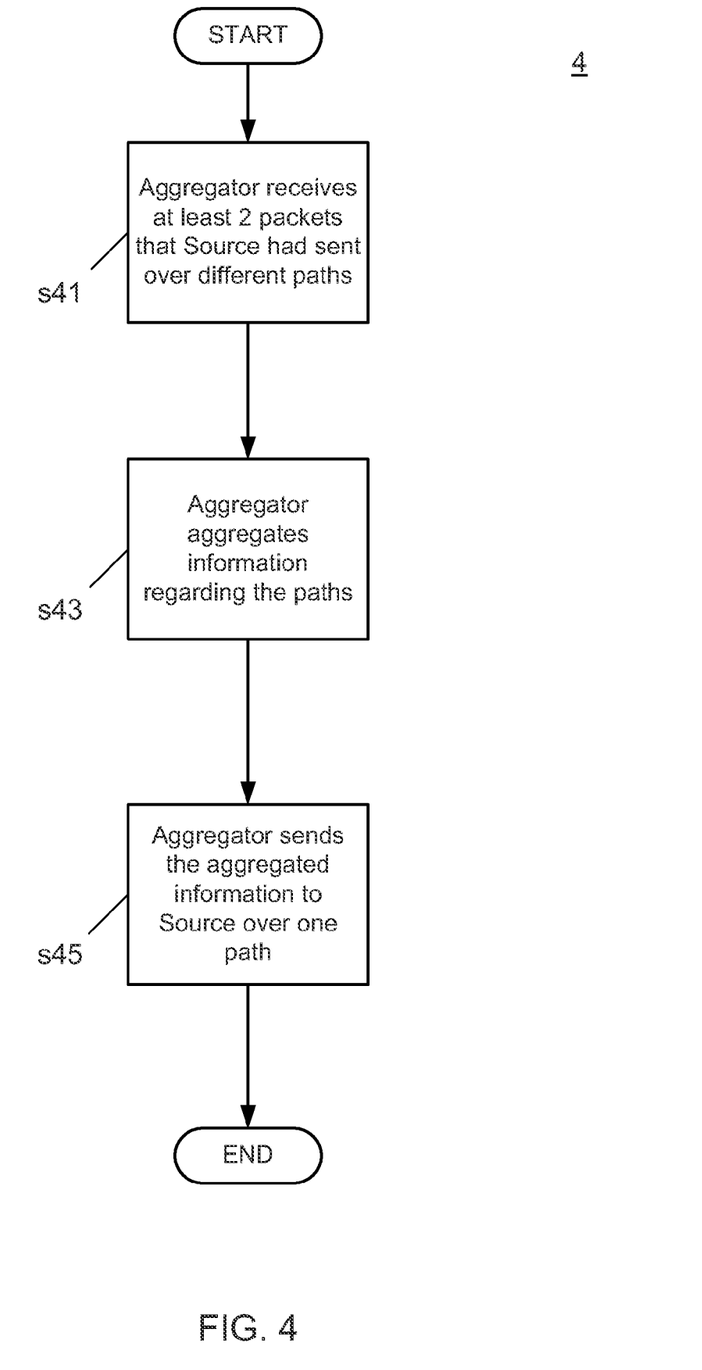
FIG. 4 illustrates a flow diagram of a process for an aggregator-side implementation, according to an embodiment of the present invention.

Referring to FIG. 4, the Aggregator device 12 receives these messages from the different paths in step S41. After receiving messages from at least two of the different paths, in step S43, the Aggregator device 12 aggregates information. According to various embodiments, the information includes at least information regarding the performance of those paths. Then, in step S45, the Aggregator device 12 sends the aggregated information ("Aggregator Feedback") to the Source device 10 over one path. That is, instead of sending separate messages to the Source device 10, one for each path, the Aggregator device 12 combines some or all of the Aggregator Feedback into a single message. In some embodiments, the Aggregator Feedback may be sent over the most direct path, any direct path, the fastest path, or any path.

According to some embodiments, the Aggregator device 12 includes buffer(s) that correspond with a path between the Source device 10 and the Aggregator device 12. A buffer for a path contains data sent to the Aggregator device 12 over that path. In further embodiments, an Aggregator device 12 with a buffer for each of multiple paths may have a first buffer for a first path that is more full, equally full, or less full than a second buffer for a second path. The fullness of a buffer is referred to as "buffer occupancy."

For example, in a non-limiting, exemplary embodiment, video data is sent over four separate paths from a Source device 10 to an Aggregator device 12. The first path is initially used to send the top left portion of each video frame, the second path is initially used to send the top right portion of each video frame, the third path is initially used to send the bottom left potion of each video frame, and the fourth path is initially used to send the bottom right portion of each video frame. The video data received over the first path is stored by the Aggregator device 12 in a buffer dedicated to the first path. Data received over the second path is stored in a different buffer, which is dedicated to the second path, and so on.

In further embodiments, the Aggregator Feedback includes feedback about one or more relative buffer occupancies of one or more paths. For example, in some embodiments, a buffer occupancy of a path is compared to a reference buffer occupancy level. In some embodiments, the reference buffer occupancy level is calculated based on the status buffer occupancies of one or multiple paths.

Continuing the non-limiting example embodiment above (regarding sending video data over four paths), the Aggregator device 12 sends information back to the Source device 10 concerning the buffer occupancy of each of four buffers, relative to the occupancy of all four of the buffers. For example, a first buffer may be filled to a relatively normal level ("normal"), a second buffer may be relatively full (e.g., more than 75% occupied with data), a third buffer may be normal (e.g., between 25% to 75% occupied with data), and a fourth buffer may be relatively empty (e.g., less than 25% occupied with data). The Aggregator device 12 determines a relative buffer occupancy of each path based on the collective buffer occupancies of the four paths. By way of example, assume that the Aggregator device 12 determines that the reference buffer occupancy level is normal, based on the collective data obtained from the four buffers. Then, the Aggregator device 12 provides relative buffer occupancy information to the source device that the first path and the third path have buffer occupancies equal to the relative buffer occupancy, the second path has a buffer occupancy that is greater than the relative buffer occupancy, and the fourth path has a relative buffer occupancy that is less than the reference buffer occupancy level.

Returning to FIG. 3, in step S36, the Source device 10 receives the Aggregator Feedback from the Aggregator device 12, that had been sent over the one path. In step S38, the Source device 10 makes one or more calculations regarding the performance of at least one of the paths, based at least in part on the Aggregator Feedback.

In various embodiments, these calculation(s) are used for traffic rate adaptation and error handling. According to various embodiments, the level of network traffic sent to each path is then adjusted based on these calculations. For example, in some non-limiting, exemplary embodiments, if the buffer occupancy of a first path is better than the buffer occupancy of a second path, then the Source device 10 directs some or all traffic to the first path instead of the second path. In the non-limiting example embodiment above (regarding sending video data over four paths), the Source device 10 may determine that more traffic should be sent to the fourth path and less to the second path. That is because the Aggregator device 12 had a buffer occupancy for the fourth path that was relatively empty and a buffer occupancy for the second path that was relatively full.

A generalized example of a process involving a configuration message ("Feedback Configuration") is described with reference to FIG. 5. The Source device 10 sends a configuration message to inform the Aggregator device 12 of information related to configuration. In some embodiments, this information may include, but is not limited to, information regarding the existence of the Source device 10, identification of the Source device 10, and/or measurement parameters. In various embodiments, the configuration message may be sent over a direct path which requires no helper devices 24, 26, or it may be sent over an indirect path which includes one or more helper devices 24, 26. The Source device 10 sends the signaling messages over at least two paths. According to some embodiments, the Aggregator device 12 then performs one or more calculations regarding the performance of at least one path. In further embodiments, the calculations are performed at least in part by comparing the performance of a path against one or more measurement parameters obtained from the configuration message. In yet further embodiments, the Aggregator device 12 sends the aggregated results from those calculation(s) to the Source device 10 in the Aggregator Feedback. In some embodiments, the Source device 10 performs one or more further calculations, based at least in part on the Aggregator Feedback.

Figure 5:
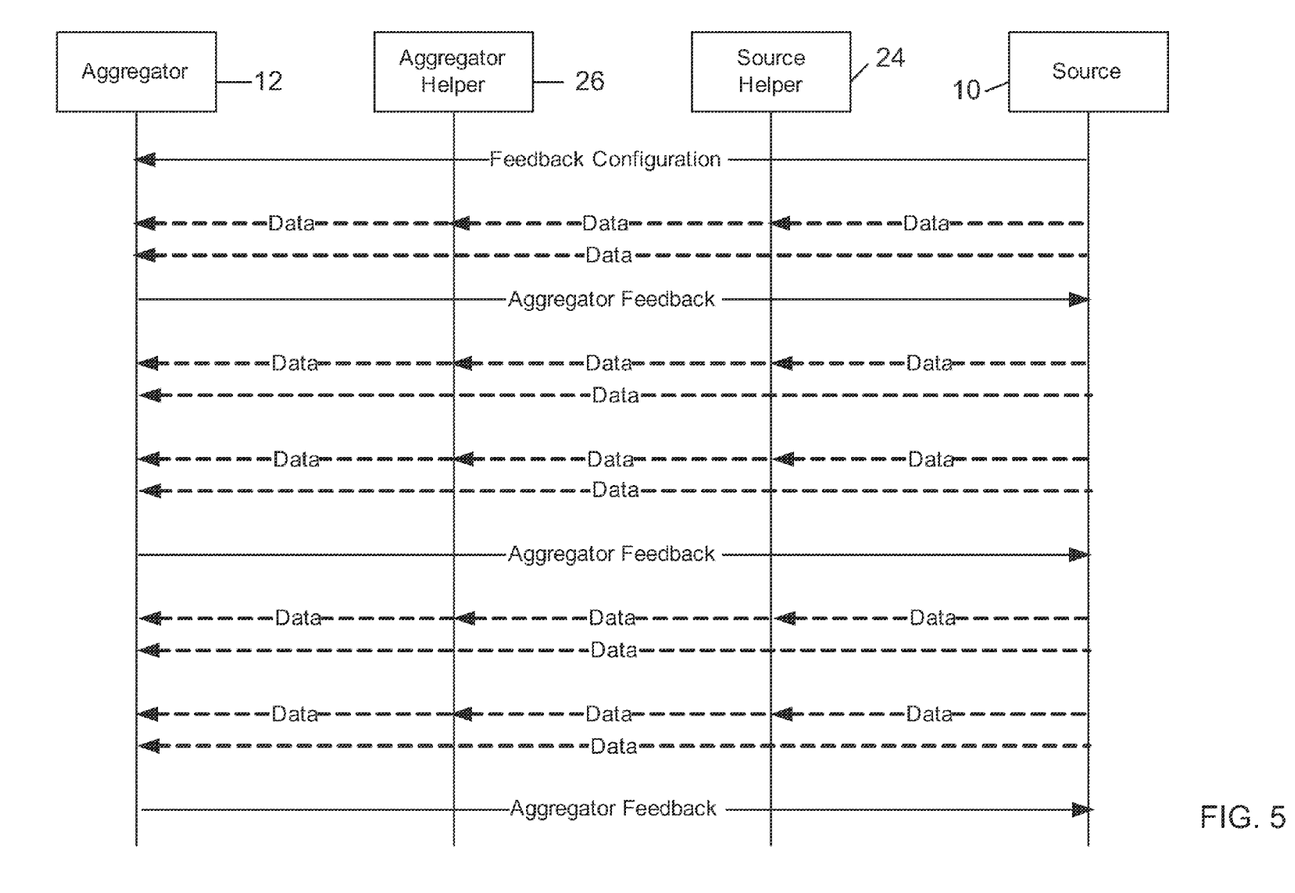
FIG. 5 illustrates a flow chart of a process for a call flow of feedback, according to an embodiment of the present invention.

According to various embodiments, as illustrated in FIG. 5, the Aggregator device 12 sends an Aggregator Feedback message to the Source device 10 periodically. In some further embodiments, the periodic interval can be revised dynamically. In other embodiments, the Aggregator Feedback message is not sent periodically. In some embodiments, the performance of one or more paths is taken periodically and an average is calculated. In further embodiments, the average is used for adjusting traffic routed to one or more paths. This may provide a more useful snapshot of the performance of the path(s) because the performance taken at any one time may be unusually poor or unusually good, and not representative of the performance that can be reasonably expected.

In various embodiments, the configuration message may include, but is not limited to, information regarding buffer, Packet Loss Ratio (PLR), and/or receiving data rate.

Figure 6A:
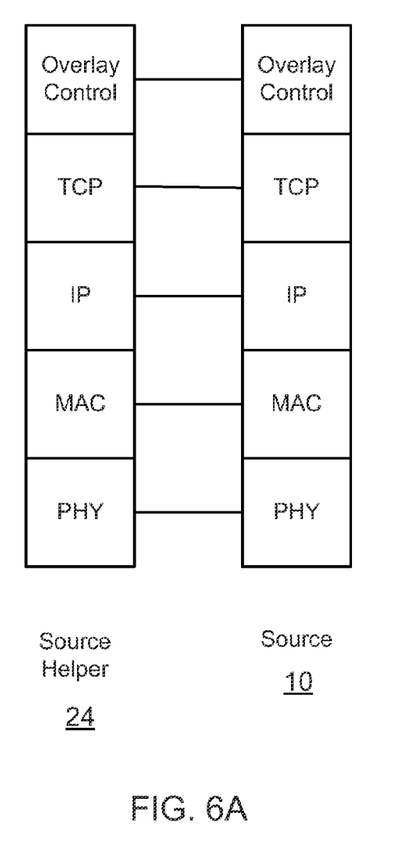
FIGS. 6A-6C illustrate diagrammatic representations of protocol stacks of control planes, according to an embodiment of the present invention.
Figure 6B:
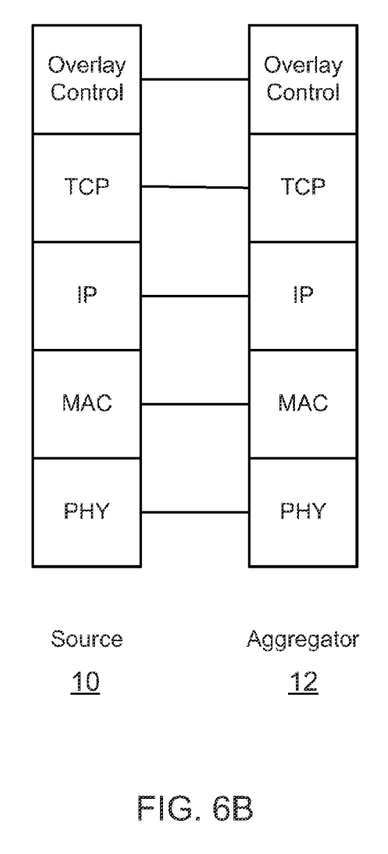
Figure 6C:
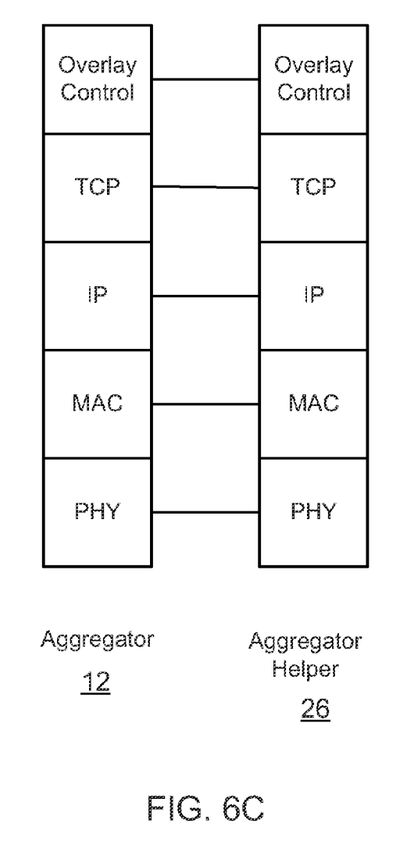

FIGS. 6A-6C illustrate control plane protocol stacks in accordance with an embodiment regarding a multiple path overlay network. The control plane is the part of the network node architecture concerned with determining where to route information. The multiple path overlay network uses Transmission Control Protocol (TCP) ports for transporting overlay network signaling messages. TCP/Internet Protocol (TCP/IP) transport is used over the pairs of nodes in FIGS. 6A-6C, if a data path segment is expected over the pair. Specifically, these pairs of nodes include the Source device 10 and the Source Helper device 24 (illustrated in FIG. 6A), the Source device 10 and the Aggregator device 12 (illustrated in FIG. 6B), and the Aggregator Helper device 26 and the Aggregator device 12 (illustrated in FIG. 6C). The Media Access Control (MAC) data communication protocol sub-layer translates between the network addressing methods used in the IP sub-layer and data link addressing of the physical layer (PHY).

According to various embodiments, statistics regarding paths are reported through the Real-Time Transport Control Protocol (RTCP). In some embodiments, these statistics may include, but are not limited to, statistics related to delay, jitter, lost packet counts, and/or transmitted octet and packet counts.

Figure 7:
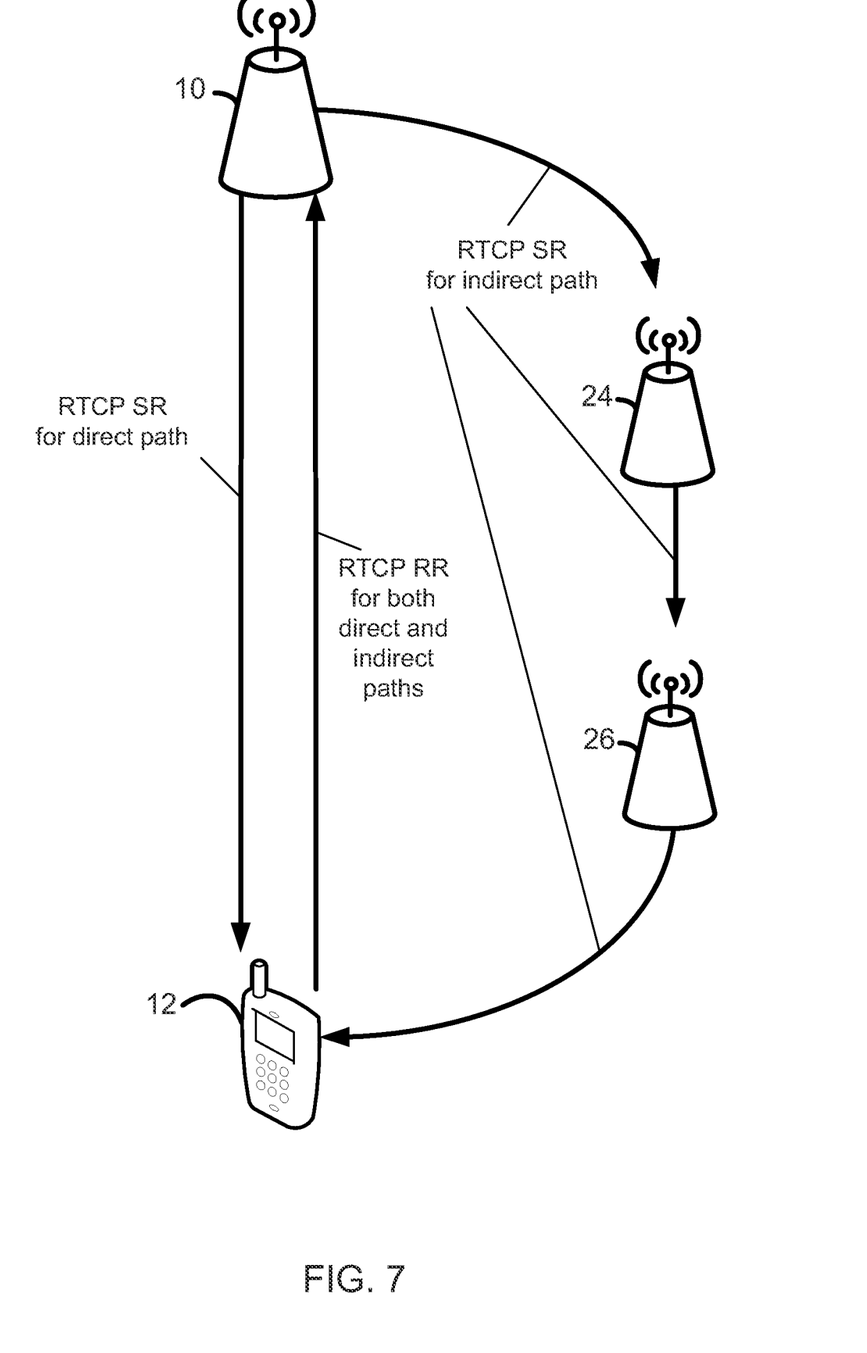
FIG. 7 illustrates an exemplary network environment corresponding with FIG. 2, utilizing Real-Time Transport Control Protocol (RTCP) according to an embodiment of the present invention.

FIG. 7 illustrates a system corresponding with system 2 of FIG. 2, in accordance with an embodiment regarding a multiple path overlay network. RTCP Sender Report (SR) messages are sent from the Source device 10 to the Aggregator device 12 using an overlay network path to ensure that they follow the same routes as their corresponding Real-time Transport Protocol (RTP) data. Hence, SR messages for a direct path (not involving helper devices 24, 26) follow that direct path. Similarly, SR messages for an indirect path (involving helper devices 24, 26) follow the indirect path that requires helper devices 24, 26.

RTCP Receiver Report (RR) messages are sent outside the overlay network from the Aggregator device 12 to the Source device 10. According to various embodiments, RR messages follow direct paths that do not require helper devices 24, 26.

Figure 8:
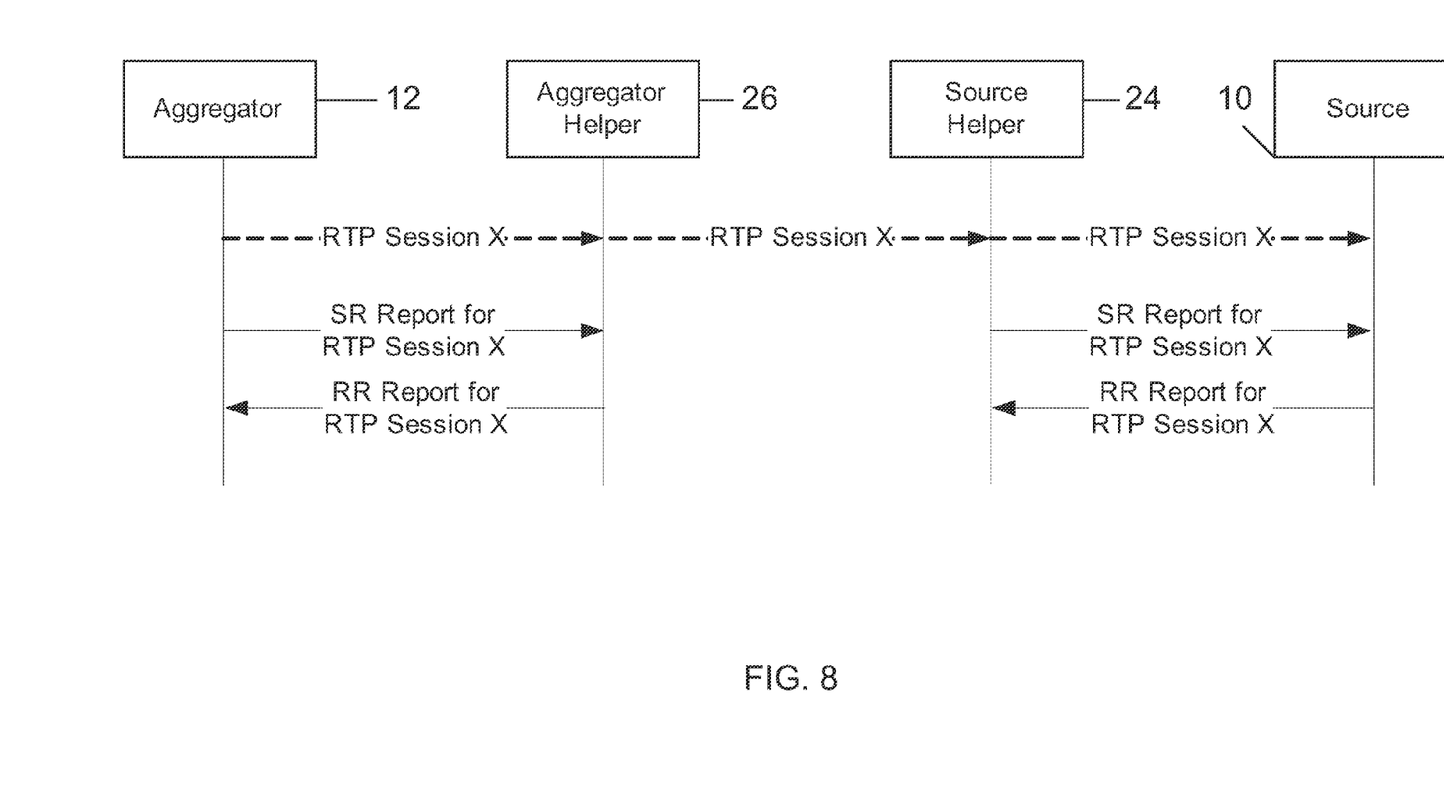
FIG. 8 illustrates a flow chart of a process for a RTCP report with helpers, according to an embodiment of the present invention.

A generalized example of a process carried out by a Source device 10 is described with reference to FIG. 8. The traffic statistics information between a Source device 10 and a Source Helper device 24, and between an Aggregator device 12 and an Aggregator Helper device 26, can provide important information for determining whether a specific helper is useful. The feedback information between a Source device 10 and a Source device 10 and a Source Helper device 24, and between an Aggregator device 12 and an Aggregator Helper device 26, is carried using standard RTCP sessions. These two RTCP sessions are associated with the RTP session from the Source device 10 to the Aggregator device 12. These RTCP reports are illustrated in FIG. 8. In various embodiments, the Source device 10 and/or its Source Helper device 24 decides whether to drop the path and release the Source Helper device 24, based on the RTCP feedback information. In various embodiments, the Aggregator device 12 and/or its Aggregator Helper device 26 decides whether to drop the path and release the Aggregator Helper device 26, based on the RTCP feedback information.

Figure 9:
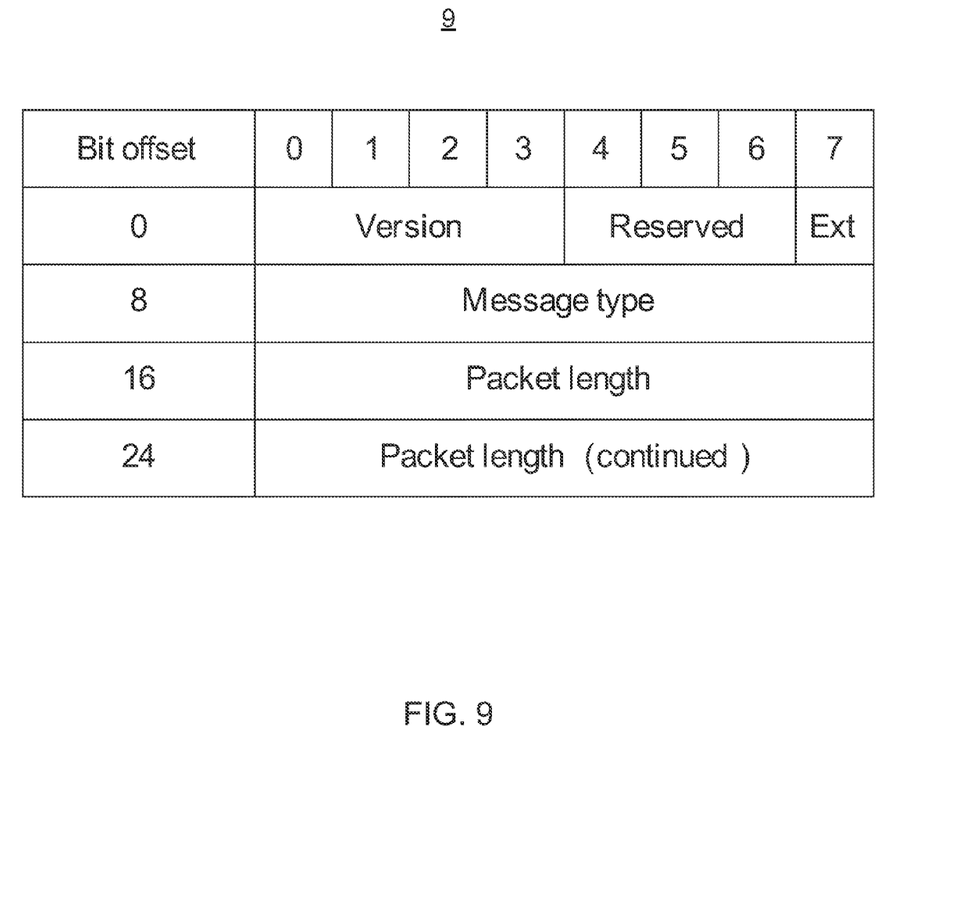
FIG. 9 illustrates a diagrammatic representation of a packet header of a multiple path overlay network signaling message, according to an embodiment of the present invention.

FIG. 9 illustrates a non-limiting, exemplary packet header 9 of a signaling message, in accordance with an embodiment regarding a multiple path overlay network. In some embodiments, the message type field in the packet header 9 is set according to signaling message types. In some embodiments, the payload of signaling messages may start immediately after the packet header 9 or otherwise after the packet header 9.

In some embodiments, the version field of the packet header 9 indicates the version of the overlay network protocol. In the non-limiting example in FIG. 9, the field is four bits long, and is positioned at the start of the packet header 9.

According to some embodiments, the extension header field (Ext) of the packet header 9 indicates whether there is an extension header after the standard header. In the non-limiting example in FIG. 9, the field is one bit, and is positioned at bit offset seven of the packet header 9.

In some embodiments, the message type field of the packet header 9 indicates the overlay network message type. In the non-limiting example in FIG. 9, the field is eight bits long, and is positioned at bit offset eight of the packet header 9. In some embodiments, the value of the message type field may indicate data, signaling, a Source device 10-initiated session request, an Aggregator Helper device 26 join request, an Aggregator Helper device 26 join response, a Source device 10 join request, a Source device 10 join response, a Source Helper device 24 join request, a Source Helper device 24 join response, an Aggregator device 12 switch request, an Aggregator device 12 switch response, a Source Helper device 24 switch request, a Source Helper device 24 switch response, an Aggregator device 12 release notification, a Source device 10 release notification, a helper device 24, 26 release command, a helper device 24, 26 release notification, a configuration message, Aggregator Feedback, or the like.

According to some embodiments, the packet length field of the packet header 9 indicates the number of bytes in the payload of the packet. In the non-limiting example in FIG. 9, the field is sixteen bits long, and is positioned starting at bit offset sixteen of the packet header 9.

In some embodiments, fields of the configuration message may include the following fields (but is not limited to): an overlay network address of the Source device 10, an overlay network address of the Aggregator device 12, a session ID of the data traffic session that needs feedback, a buffer occupancy difference window in time among multiple paths, above which the Aggregator device 12 utilizes to signal for synchronization, a moving average coefficient used to update a measurement, a time interval for sampling measurements, a time interval for the Aggregator device 12 to send performance feedback information to the Source device 10, and/or padding.

According to some embodiments, the moving average coefficient is applied to the packet loss ratio and the throughput according to Equation 1, $$S_{i+1}=\alpha*s+(1-\alpha)*S_i \quad (1)$$

where α denotes the moving average coefficient, s denotes the current measurement, and $S_i$ denotes the i-th moving average. In some embodiments, the moving average coefficient α is in the unit of $\frac{1}{16}$. As a non-limiting example, if the moving average coefficient α is $\frac{3}{16}$, the multiplier is 3.

In some embodiments, fields of the Aggregator Feedback may include the following fields (but is not limited to): an overlay network address of the Aggregator device 12, an overlay network address of the Source device 10, a session ID of the data traffic session that needs feedback, a number of paths reported in the Aggregator Feedback, and/or padding. In further embodiments, fields of the Aggregator Feedback include (but is not limited to), for each path reported: a path index of the data path for which the feedback information is collected, a buffer level code, a buffer difference code, a packet loss ratio, a starting time stamp of the most significant packet loss burst (if any), a stopping time stamp of the most significant packet loss burst (if any), and/or a receiving data rate of packets sent at the Source device 10.

According to some embodiments, the buffer level code may indicate overflow, overflow prolonged, normal, and/or initial buffer reached. In some further embodiments, before the initial buffer is reached for one of the paths, the buffer level code field is set to indicate a normal state. Once the initial buffer is reached for the first time for at least one path, the buffer level code is set to indicate that the initial buffer has been reached. Upon receiving an indication that the initial buffer has been reached, the Source device 10 takes subsequent calibration actions.

In some embodiments, the buffer difference code may indicate that the status is above the window, below the window, or normal with respect to the average buffer occupancy in time. In some further embodiments, the Aggregator device 12 calculates a reference buffer size in time according to Equations 2-4, where the reference buffer size in time is denoted by $B_{ref}$, the buffer occupancy of the i-th path is denoted by $B(i)$, and the buffer occupancy difference bound in time is denoted by W. If the expression of Equation 2 is true, then the buffer difference code indicates 'normal':

$$|B(i)-B_{ref}| \leq W/2 \qquad (2)$$

If the expression of Equation 3 is true, then the buffer difference code indicates 'below the window':

$$B_{ref}-B(i)>W/2 \qquad (3)$$

If the expression of Equation 4 is true, then the buffer difference code indicates 'above the window':

$$B(i)-B_{ref}>W/2 \qquad (4)$$

In some embodiments, the reference buffer size is calculated as follows. The initial buffer size for playback is denoted by $B_I$, the lower bound of the normal buffer size range is denoted by $B_L$, and the upper bound of the normal buffer size range is denoted by $B_U$. In some embodiments, whether there are data paths with buffer sizes that are close to the initial buffer size is determined using Equation 5:

$$|B(i)-B_I| \leq W/2 \qquad (5)$$

If there are such paths, those paths should be included for calculating a reference buffer level. The reference buffer level is set to the average buffer size of those paths. If there are no such paths, determine whether there are data paths with buffer sizes that are within the normal size range, using Equation 6:

$$B_L \leq B(i) \leq B_U \qquad (6)$$

In some embodiments, if there are such paths, those paths are included for calculating a reference buffer level. In some embodiments, the reference buffer level is set to the average buffer size of those paths.

According to some embodiments, before the initial buffer is reached for one of the paths, the buffer difference code should be set to indicate 'normal' on all paths. In various embodiments, once the initial buffer is reached for the first time for at least one path, the buffer difference code is generated using the above Equations 2-4.

In some embodiments, the calculation(s) done by the Source 10 in step S38 of FIG. 3 are based at least in part on the "round-trip" time of the messages. The RTCP feedback provides round-trip time information of the path. The delay from the source to the aggregator over any path is calculated based on the round-trip time information. The round trip time is the time it took for the signaling messages to be sent from the Source device 10 to the Aggregator device 12, and the time it took for the Aggregator Feedback to be sent from the Aggregator device 12 to the Source device 10.

For example, referring to FIG. 2, consider the non-limiting example in which one signaling message was sent over the direct path (directly between the Source Device 10 and the Aggregator device 12) and another signaling message was sent over the indirect path (the path through the Source Helper 24 and the Aggregator Helper 26), then Aggregator Feedback was sent through the direct path. In this example, according to some embodiments, the time to travel the direct path is estimated as one-half the round-trip time. This is illustrated by Equation 7, where the round trip time over the direct path (both directions) is denoted by RTT(0) and the delay in the time to travel the direct path in one direction is denoted by $D(0)$:

$$D(0)=RTT(0)/2 \qquad (7)$$

In some embodiments, the round-trip time regarding the direct path is estimated as the time for the direct-path signaling message to arrive once it was sent, added to the time for the direct-path Aggregator Feedback to arrive once it was sent.

This exemplary calculation is based on the assumption that the direct-path travel time from the Source 10 to the Aggregator device 12 is roughly the same as the direct-path travel time from the Aggregator device 12 to the Source device 10. In other embodiments, if they are not roughly the same, the calculations are adjusted to account for those differences.

Continuing with the example, once the time to travel the direct path is estimated, in some embodiments, it is used to estimate the time to travel the indirect path. The round-trip time regarding the indirect path is estimated as the time for the indirect-path signaling message to arrive once it was sent, added to the time for the direct-path Aggregator Feedback to arrive once it was sent. The time to travel the indirect path is estimated as the round-trip time regarding the indirect path minus the time to travel the direct path. This is illustrated by Equation 8, where the round trip time including the delay of the indirect path and the direct path is denoted by $RTT(i)$ and the delay in the time to travel the indirect path in one direction is denoted by $D(i)$:

$$D(i)=RTT(i)-D(0) \qquad (8)$$

Those of skill would further appreciate that the various illustrative logical blocks, modules, circuits, and algorithm steps described in connection with the embodiments disclosed herein may be implemented as electronic hardware, computer software, firmware, or combinations of those. To clearly illustrate this interchangeability of hardware, software, and firmware, various illustrative components, blocks, modules, circuits, and steps have been described above generally in terms of their functionality. Whether such functionality is implemented as hardware, software, or firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method of providing feedback over a network, the method comprising:
    sending at least two transmissions, from a first device in the network to a second device in the network;
    wherein a first transmission of said at least two transmissions is sent over a first path of the network, and a second transmission of said at least two transmissions is sent over a second path of the network, such that the first path and the second path are different paths of the network; and
    receiving, by the first device from the second device, from over a first path of the network, information about the performance of at least two paths of the network.

2. The method of claim 1, further comprising:
    making one or more calculations regarding the performance of at least one path of the network, based on the received information.

3. The method of claim 2, further comprising:
    adjusting an amount of traffic sent to one or more paths of the network, based at least in part on the one or more calculations.

4. The method of claim 1, further comprising:
    calculating, by the first device, a travel time of a transmission along a second path of the network by subtracting a travel time along the first path of the network from a round-trip time, wherein the round-trip time is a sum of the travel time of the transmission along the second path and the travel time along the first path of the network.

5. The method of claim 1, wherein the received information includes information related to at least one buffer occupancy of the second device, the buffer occupancy relating to at least one path of the network.

6. The method of claim 5, wherein the information related to at least one buffer occupancy relating to at least one path includes a comparison of one or more buffer occupancies to a combined buffer occupancy relating to multiple paths or a buffer occupancy relating to one or more paths other than the at least one path.

7. The method of claim 1, wherein the received information does not include a value or range of artificial delay for transmission over one or more paths of the network.

8. The method of claim 1, further comprising: aggregating a first message about the first path and a second message about the second path into an aggregated message; wherein the information comprises the aggregated message.

9. The method of claim 8, wherein the second device is a mobile device, and the second device aggregates the first message and the second message into the aggregated message.

10. The method of claim 1, wherein the information comprises feedback information about the first path and the second path of the network.

11. The method of claim 1, wherein the first device is a base station, and the second device is a mobile device.

12. A system for providing feedback over a network, the system comprising:
    a processor configured to:
        send at least two transmissions, from a first device in the network to a second device in the network;
        wherein a first transmission of said at least two transmissions is sent over a first path of the network, and a second transmission of said at least two transmissions is sent over a second path of the network, such that the first path and the second path are different paths of the network; and
        receive, by the first device from the second device, from over a first path of the network, information about the performance of at least two paths of the network.

13. The system of claim 12, the processor further configured to:
    make one or more calculations regarding the performance of at least one path of the network, based on the received information.

14. The system of claim 13, the processor further configured to:
    adjust an amount of traffic sent to one or more paths of the network, based at least in part on the one or more calculations.

15. The method of claim 12, the processor further configured to:
    calculate a travel time of a transmission along a second path of the network by subtracting a travel time along the first path of the network from a round-trip time, wherein the round-trip time is a sum of the travel time of the transmission along the second path and the travel time along the first path of the network.

16. The system of claim 12, wherein the received information includes information related to at least one buffer occupancy of the second device, the buffer occupancy relating to at least one path of the network.

17. The method of claim 16, wherein the information related to at least one buffer occupancy relating to at least one path includes a comparison of one or more buffer occupancies to a combined buffer occupancy relating to multiple paths or a buffer occupancy relating to one or more paths other than the at least one path.

18. The system of claim 12, wherein the received information does not include a value or range of artificial delay for transmission over one or more paths of the network.

19. A computer program product for providing feedback over a network, the computer program product comprising:
a non-transitory machine-readable medium encoded with codes executable to:
send at least two transmissions, from a first device in the network to a second device in the network;
wherein a first transmission of said at least two transmissions is sent over a first path of the network, and a second transmission of said at least two transmissions is sent over a second path of the network, such that the first path and the second path are different paths of the network; and
receive, by the first device from the second device, from over a first path of the network, information about the performance of at least two paths of the network.

20. A method of providing feedback over a network, the method comprising:
receiving at least two transmissions, by a second device in the network, from a first device in the network;
wherein a first transmission of said at least two transmissions is received from a first path of the network, and a second transmission of said at least two transmissions is received from a second path of the network, such that the first path and the second path are different paths of the network; and
sending information about the performance of the paths of the network from the second device to the first device, over a first path of the network.

21. The method of claim 20, wherein the sent information includes information related to at least one buffer occupancy of the second device, the buffer occupancy relating to one or more paths of the network.

22. The method of claim 21, wherein the information related to at least one buffer occupancy relating to at least one path includes a comparison of one or more buffer occupancies to a combined buffer occupancy relating to multiple paths or a buffer occupancy relating to one or more paths other than the at least one path.

23. The method of claim 20, wherein the sent information does not include a value or range of artificial delay for transmission over one or more paths of the network.

24. A system for providing feedback over a network, the system comprising:
a processor configured to:
receive at least two transmissions, by a second device in the network, from a first device in the network;
wherein a first transmission of said at least two transmissions is received from a first path of the network, and a second transmission of said at least two transmissions is received from a second path of the network, such that the first path and the second path are different paths of the network; and
send information about the performance of the paths of the network from the second device to the first device, over a first path of the network.

25. The system of claim 24, wherein the sent information includes information related to at least one buffer occupancy of the second device, the buffer occupancy relating to at least one path of the network.

26. The method of claim 24, wherein the information related to at least one buffer occupancy relating to at least one path includes a comparison of one or more buffer occupancies to a combined buffer occupancy relating to multiple paths or a buffer occupancy relating to one or more paths other than the at least one path.

27. The system of claim 24, wherein the sent information does not include a value or range of artificial delay for transmission over one or more paths of the network.

28. A computer program product for providing feedback over a network, the computer program product comprising:
a non-transitory machine-readable medium encoded with codes executable to:
receive at least two transmissions, by a second device in the network, from a first device in the network;
wherein a first transmission of said at least two transmissions is received from a first path of the network, and a second transmission of said at least two transmissions is received from a second path of the network, such that the first path and the second path are different paths of the network; and
send information about the performance of the paths of the network from the second device to the first device, over a first path of the network.

* * * * *